United States Patent
Haddadin

(10) Patent No.: US 11,097,423 B2
(45) Date of Patent: Aug. 24, 2021

(54) METHOD FOR CONTROLLING A ROBOT MANIPULATOR FOR SCREWING IN A SCREW

(71) Applicant: Franka Emika GmbH, Munich (DE)

(72) Inventor: Sami Haddadin, Hannover (DE)

(73) Assignee: Franka Emika GmbH, Munich (DE)

( * ) Notice: Subject to any disclaimer, the term of this patent is extended or adjusted under 35 U.S.C. 154(b) by 262 days.

(21) Appl. No.: 16/095,185

(22) PCT Filed: Apr. 24, 2017

(86) PCT No.: PCT/EP2017/059649
§ 371 (c)(1),
(2) Date: Oct. 19, 2018

(87) PCT Pub. No.: WO2017/186636
PCT Pub. Date: Nov. 2, 2017

(65) Prior Publication Data
US 2019/0143519 A1    May 16, 2019

(30) Foreign Application Priority Data

Apr. 24, 2016  (DE) ..................... 10 2016 004 944.8
Apr. 27, 2016  (DE) ..................... 10 2016 107 841.7

(51) Int. Cl.
*B25J 9/16*    (2006.01)

(52) U.S. Cl.
CPC ........... *B25J 9/1669* (2013.01); *B25J 9/1633* (2013.01); *B25J 9/1687* (2013.01); *G05B 2219/45091* (2013.01)

(58) Field of Classification Search
CPC ...... B25J 9/1669; B25J 9/1633; B25J 9/1687; G05B 2219/45091
See application file for complete search history.

(56) References Cited

U.S. PATENT DOCUMENTS

| 4,707,907 A | 11/1987 | Ivanov | |
|---|---|---|---|
| 2013/0067711 A1* | 3/2013 | Harada | B25J 9/1679 29/407.01 |
| 2015/0047471 A1* | 2/2015 | Yoshinaga | B23P 19/06 81/57.4 |

FOREIGN PATENT DOCUMENTS

| DE | 102012010662 A1 | 12/2012 |
|---|---|---|
| JP | 54-2438 B | 7/1979 |

(Continued)

OTHER PUBLICATIONS

Machine translation of JPH0671527, Mar. 15, 1994, Chizuru Inoue.*

(Continued)

*Primary Examiner* — Jeff A Burke
*Assistant Examiner* — Mohamad O El Sayah
(74) *Attorney, Agent, or Firm* — Hoffmann & Baron, LLP

(57) ABSTRACT

The invention relates to a method of controlling a movable robot manipulator for screwing in a screw at least already plugged into a thread, wherein the screw has a screw head with a tool engagement interface, the robot manipulator has at its distal end a tool designed to engage the tool engagement interface, the screw has a screw central axis, and the tool has a tool central axis about which the tool of the robot manipulator is rotatable. The proposed method includes the following steps of: defining a position of the tool engagement interface of the screw at least plugged into the thread, positioning the tool over the tool engagement interface and orienting the tool central axis with a maximum deviation of 8° concentrically with the screw central axis, with force-regulated and/or impedance-regulated closed tilting movement of the tool central axis, moving the tool along the tool central axis into the tool engagement interface until there is a connection between the tool and the tool engagement interface, screwing in the screw in a first direction of rotation of the tool until a defined limit value G1 of a torque/force acting on the tool has been reached or exceeded, once the limit value G1 has been reached or exceeded, turning back (Continued)

the tool counter to the first direction of rotation through a defined angle in the range of [0.01° to 10°], and removing the tool from the tool engagement interface along the tool central axis.

20 Claims, 1 Drawing Sheet

(56) References Cited

FOREIGN PATENT DOCUMENTS

| | | |
|---|---|---|
| JP | 61-265226 A | 11/1986 |
| JP | 63-237827 A | 10/1988 |
| JP | 06-71527 A | 3/1994 |
| JP | 8-57719 A | 3/1996 |
| JP | 2002-166333 A | 6/2002 |
| JP | 2012161860 A | 8/2012 |
| JP | 2015-36180 A | 2/2015 |
| JP | 5717811 B2 | 3/2015 |
| WO | WO-2005049286 A1 * 6/2005 .............. B23P 19/10 |

OTHER PUBLICATIONS

Machine translation of JP-2012161860-A, Aug. 30, 2012, Genaki Chiba.*
Machine translation of WO-2005049286-A1, Jun. 2005, Jurgen Ehleiter.*
English translation of the International Preliminary Report on Patentability dated Nov. 8, 2018 for International Application No. PCT/EP2017/059649.

* cited by examiner

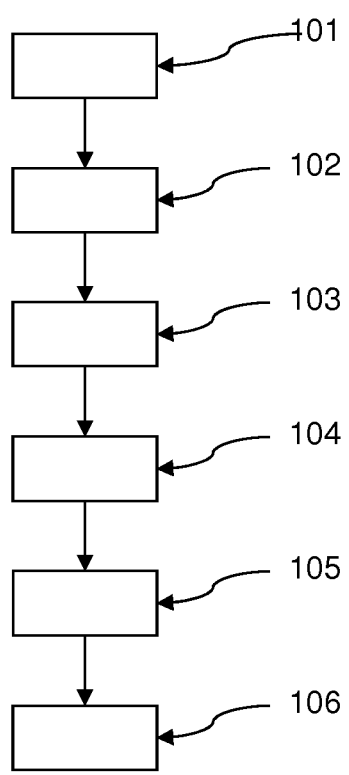

METHOD FOR CONTROLLING A ROBOT MANIPULATOR FOR SCREWING IN A SCREW

CROSS-REFERENCE TO RELATED APPLICATIONS

This application is the U.S. National Phase of International Patent Application No. PCT/EP2017/059649, filed on 24 Apr. 2017, which claims benefit of German Patent Application No. 102016004944.8, filed on 24 Apr. 2016, and German Patent Application No. 102016107841.7, filed on 27 Apr. 2016 the contents of which are incorporated herein by reference in their entirety.

BACKGROUND

Field

The invention relates to a method and a device of controlling a movable actuator-operated robot manipulator for screwing in a screw at least already plugged into a thread. Furthermore, the invention relates to a robot with such a device, a computer system, a digital storage medium, a computer program product, as well as a computer program.

Related Art

The problem which the invention proposes to solve is to indicate a method of controlling a movable robot manipulator for screwing in a screw at least already plugged into a thread.

SUMMARY

The invention will emerge from the features of the independent claims. Advantageous modifications and embodiments are the subject matter of the dependent claims. Further features, application possibilities, and benefits of the invention will emerge from the following specification, as well as the discussion of a sample embodiment of the invention, represented in FIG. 1.

A first aspect of the invention relates to a method of controlling a movable actuator-operated robot manipulator for screwing in a screw at least already plugged into a thread. The robot manipulator preferably has 4 to 7 degrees of freedom. It will be advantageously assumed that the thread itself is fixed in space, or is part of a larger object fixed in space (such as an engine block). The screw is advantageously partly screwed into the thread, e.g., by one or more turns, so that the screw is already engaged in the thread. The screw has a screw head with a tool engagement interface as well as a screw central axis. The robot manipulator has at its distal end a tool which is designed to engage in the tool engagement interface. Furthermore, the tool has a tool central axis about which the tool of the robot manipulator is rotatable.

The proposed method involves the following steps: in a first step, a position of the tool engagement interface of the screw at least plugged into the thread is defined. In a second step, a positioning of the tool over the tool engagement interface and an orienting of the tool central axis with a maximum deviation of 8° concentrically with the screw central axis is done. In a third step, with force-regulated and/or impedance-regulated closed tilting movements of the tool central axis, the tool is moved along the tool central axis into the tool engagement interface until there is a connection between the tool and the tool engagement interface. The connection is advantageously such that during the following screwing in of the screw (fourth step) it converges in a positive locking connection, or a positive locking connection already exists at the end of the third step. In a fourth step, the screw is screwed in with a first direction of rotation of the tool until a defined limit value G1 of a torque/force acting on the tool has been reached or exceeded. The screwing in of the screw is such that the tool is moved rotating in a first direction of rotation and along the screw central axis in the direction of the thread. In a fifth step, once the limit value G1 has been reached or exceeded, the tool is turned back counter to the first direction of rotation through a defined angle in the range of [0.01° to 10°] Advantageously, the turning back of the tool is done in a yielding and/or force-regulated manner. In a sixth step, the tool is removed from the tool engagement interface along the tool central axis.

The removal of the tool is done advantageously under force-regulated and/or impedance-regulated closed tilting movements of the tool central axis.

Advantageously, in addition to the closed tilting movements of the tool central axis in the third and/or sixth step, superimposed lateral and likewise closed translatory movements of the tool central axis are also executed. Furthermore, advantageously the closed tilting movements in the third and/or sixth step occur in a tilting plane. Furthermore, advantageously the tilting movements of the tool central axis in the third and/or sixth step have one tilting component in a tilting plane and one tilting component perpendicular to that plane.

The proposed method, thanks to the closed tilting movements and the closed superimposed lateral translatory movements, of the tool central axis makes possible in particular a good reliability for the screwing of a screw into a thread. Furthermore, the proposed method enables the use of standard screws, in place of costly industrial screws.

One modification of the proposed method is characterized in that, in the event that a positive locking connection is not achieved in the third or fourth step under given conditions, the second and the third step are performed again with automatically adapted parameters for the positioning of the tool and/or for the orienting of the tool central axis. Alternatively, the robot manipulator can be driven into a predefined posture in this case.

The basis for the adapted parameters for the positioning of the tool and/or for the orienting of the tool central axis is advantageously a change in the defined position of the tool engagement interface. The changed position of the tool engagement interface occurs advantageously on the basis of a given search pattern.

Advantageously, during the screwing in the fourth step either a pilot force is specified for the screwing movement or a force/torque regulation is utilized in the screw central axis in order to maintain a given nominal force/nominal torque or a nominal profile of a force/torque.

One advantageous modification of the proposed method is characterized in that the force and/or impedance regulated lateral translatory movements of the tool central axis correspond to closed or nonclosed Lissajous figures in two to six dimensions.

Advantageously, the tool central axis during the lateral translatory movements of the tool has a maximum lateral distance in the range of [0.05 mm, 5 mm] from the screw central axis. The respective possible maximum lateral distance is of course dependent on the dimensioning of the screw or the dimension of the tool engagement interface of the screw and will be chosen accordingly.

One advantageous modification of the proposed method is characterized in that, in the event that a positive locking connection is not achieved between the tool and the tool engagement interface, the tool is moved for a given distance along the tool central axis away from the tool engagement interface, the tool is rotated by a given angle about the tool central axis, and the fourth step is performed again.

Advantageously, the tool engagement interface corresponds to one of the following screw head designs:
  slot,
  outside square,
  inside square or Robertson,
  inside hexagon or Inbus,
  inside hexagon with pin,
  Phillips,
  Pozidriv,
  inner hexagon round or Torx,
  inner hexagon round with pin,
  inner multi-tooth or XZN,
  one-way slot,
  Tri-Wing,
  Torq-Set,
  Pentalob, or
  Bristol.

Moreover, the invention relates to a computer system with a data processing device, wherein the data processing device is designed such that a method as described above is executed on the data processing device.

Furthermore, the invention relates to a digital storage medium with electronically readable control signals, wherein the control signals can interact with a programmable computer system such that a method as described above is executed.

Additionally, the invention relates to a computer program product with a program code stored on a machine-readable medium for executing the method as described above when the program code is executed on a data processing device.

Finally, the invention relates to a computer program with program codes for carrying out the method as described above, when the program is run on a data processing device. For this, the data processing device may be designed as any given computer system known in the prior art.

A device to a movable actuator-operated robot manipulator for screwing in a screw at least already plugged into a thread, wherein the screw has a screw head with a tool engagement interface, the robot manipulator has at its distal end a tool designed to engage the tool engagement interface, the screw has a screw central axis, and the tool has a tool central axis about which the tool of the robot manipulator is rotatable, wherein a position of the tool engagement interface of the screw at least already plugged into the thread is known, wherein the device is configured and designed to carry out the following operations:
  positioning the tool over the tool engagement interface and orienting the tool central axis with a maximum deviation of 8° concentrically with the screw central axis,
  with force-regulated and/or impedance-regulated closed tilting movements of the tool central axis, moving the tool along the tool central axis into the tool engagement interface until there is a connection between the tool and the tool engagement interface,
  screwing in the screw in a first direction of rotation of the tool until a defined limit value G1 of a torque acting on the tool has been reached or exceeded,
  once the limit value G1 has been reached or exceeded, turning back the tool counter to the first direction of rotation through a defined angle in the range of [0.01° to 10°], and
  removing the tool from the tool engagement interface along the tool central axis.

Benefits and advantageous modifications of the device will result from an analogous and logical transfer of the remarks given above in connection with the proposed method.

Another aspect of the invention relates to a robot with a robot manipulator with a device as described above.

Further benefits, features, and details will emerge from the following specification, in which at least one sample embodiment is described in detail—making reference optionally to the drawing. The same, similar, and/or functionally identical parts are given the same reference numbers.

BRIEF DESCRIPTION OF THE DRAWINGS

In the drawings:
FIG. 1 shows a schematized representation of the course of a proposed method.

DETAILED DESCRIPTION

FIG. 1 shows a schematized representation of the course of a proposed method of controlling a 3D-movable robot manipulator for the screwing in of a screw at least already plugged into a thread, wherein the screw has a screw head with a tool engagement interface, the robot manipulator has at its distal end a tool designed to engage in the tool engagement interface, the screw has a screw central axis, and the tool has a tool central axis about which the tool of the robot manipulator is rotatable. The method involves the following steps: in a first step 101, a position of the tool engagement interface of the screw at least plugged into the thread is defined. In a second step 102, a positioning of the tool over the tool engagement interface and an orienting of the tool central axis with a maximum deviation of 8° concentrically with the screw central axis is done. In a third step 103, with force-regulated and/or impedance-regulated closed tilting movements of the tool central axis, the tool is moved along the tool central axis into the tool engagement interface until there is a positive locking connection between the tool and the tool engagement interface. In a fourth step 104, the screw is screwed in with a first direction of rotation of the tool until a defined limit value G1 of a torque/force acting on the tool has been reached or exceeded. In a fifth step, once the limit value G1 has been reached or exceeded, the tool is turned back counter to the first direction of rotation through a defined angle in the range of [0.01° to 10°]. In a sixth step 106, with force-regulated and/or impedance-regulated closed tilting movements of the tool central axis, the tool is removed from the tool engagement interface along the tool central axis.

Although the invention has been illustrated more closely and explained in detail by preferred example embodiments, the invention is not limited by the disclosed examples and other variations may be derived from this by the skilled person without leaving the protection scope of the invention. It is therefore clear that many variation options exist. It is likewise clear that, for example, the mentioned embodiments in fact only represent examples not in any way to be construed as limiting for example the protection scope, the application possibilities, or the configuration of the invention. Instead, the preceding specification and the description of the FIGURE will place the skilled person in a position to implement the example embodiments concretely, whereby the skilled person with knowledge of the disclosed idea of the invention may undertake various changes for example in regard to the function or the arrangement of individual elements mentioned in a example embodiment, without leaving the protection scope, which is defined by the claims and their legal correspondences, such as is further explained in the specification.

LIST OF REFERENCE SYMBOLS

101-106 steps of the method

The invention claimed is:

1. A method of controlling a movable robot manipulator for screwing in a screw at least already plugged into a thread, wherein the screw has a screw head with a tool engagement interface, the robot manipulator has at its distal end a tool designed to engage the tool engagement interface, the screw has a screw central axis, and the tool has a tool central axis about which the tool of the robot manipulator is rotatable, the method comprising the following steps:
   1.1. defining a position of the tool engagement interface of the screw at least plugged into the thread;
   1.2. positioning the tool over the tool engagement interface and orienting the tool central axis with a maximum deviation of 8° concentrically with the screw central axis;
   1.3. with force-regulated and/or impedance-regulated closed tilting movements of the tool central axis, moving the tool along the tool central axis into the tool engagement interface until there is a connection between the tool and the tool engagement interface;
   1.4. screwing in the screw in a first direction of rotation of the tool until a defined limit value G1 of a torque/force acting on the tool has been reached or exceeded, wherein in an event that a positive locking connection is not achieved between the tool and the tool engagement interface in step 1.3 or step 1.4, moving the tool for a given distance along the tool central axis away from the tool engagement interface, rotating the tool by a given angle about the tool central axis and performing again step 1.4;
   1.5. once the limit value G1 has been reached or exceeded, turning back the tool counter to the first direction of rotation through a defined angle in the range of 0.01° to 10°; and
   1.6. removing the tool from the tool engagement interface along the tool central axis.

2. The method as claimed in claim 1, wherein in step 1.6, removing the tool is performed under force-regulated and/or impedance-regulated closed tilting movements of the tool central axis.

3. The method as claimed in claim 2, wherein in step 1.3 and/or in step 1.6, the method comprises additionally executing closed translatory lateral movements of the tool central axis.

4. The method as claimed in claim 1, wherein in an event that a positive locking connection is not achieved between the tool and the tool engagement interface in step 1.3 or step 1.4 under given conditions, the method comprises performing again step 1.2 and step 1.3 with automatically adapted parameters for the positioning of the tool and/or for the orienting of the tool central axis, or driving the robot manipulator into a predefined posture.

5. A device to control a movable robot manipulator for screwing in a screw at least already plugged into a thread, wherein the screw has a screw head with a tool engagement interface, the robot manipulator has at its distal end a tool designed to engage the tool engagement interface, the screw has a screw central axis, and the tool has a tool central axis about which the tool of the robot manipulator is rotatable, wherein a position of the tool engagement interface of the screw at least already plugged into the thread is known, wherein the device is configured to carry out operations comprising:
   10.1. defining a position of the tool engagement interface of the screw at least plugged into the thread;
   10.2. positioning the tool over the tool engagement interface and orienting the tool central axis with a maximum deviation of 8° concentrically with the screw central axis;
   10.3. with force-regulated and/or impedance-regulated closed tilting movements of the tool central axis, moving the tool along the tool central axis into the tool engagement interface until there is a connection between the tool and the tool engagement interface;
   10.4. screwing in the screw in a first direction of rotation of the tool until a defined limit value G1 of a torque acting on the tool has been reached or exceeded, wherein in an event that a positive locking connection is not achieved between the tool and the tool engagement interface in operation 10.3 or operation 10.4, the tool is moved for a given distance along the tool central axis away from the tool engagement interface, the tool is rotated by a given angle about the tool central axis, and operation 10.4 is performed again;
   10.5. once the limit value G1 has been reached or exceeded, turning back the tool counter to the first direction of rotation though a defined angle in the range of 0.01° to 10°; and
   10.6. removing the tool fem the tool engagement interface along the tool central axis.

6. The device as claimed in claim 5, wherein in operation 10.6, removing the tool is performed under force-regulated an/or impedance-regulated closed tilting movements of the tool central axis.

7. The device as claimed in claim 6, wherein in operation 10.3 and/or in operation 10.6, the device is configured to additionally perform closed translatory lateral movements of the tool central axis.

8. The device as claimed claim 5, wherein in an event that a positive locking connection is not achieved between the tool and the tool engagement interface in operation 10.3 or operation 10.4 under given conditions, the device is configured to perform again operation 10.2 and operation 10.3 with automatically adapted parameters for the positioning of the tool and/or for the orienting of the tool central axis, or configured to drive the robot manipulator into a predefined posture.

9. A robot comprising:
   a movable robot manipulator, the robot manipulator having at its distal end a tool designed to screw in a screw; and
   a device to control the robot manipulator for screwing in the screw at least already plugged into a thread, wherein the screw has a screw head with a tool engagement interface, the tool of the robot manipulator designed to engage the tool engagement interface, the screw has a screw central axis, and the tool has a tool central axis about which the tool of the robot manipulator is rotatable, wherein a position of the tool engagement interface of the screw at least already plugged into the thread is known, wherein the device is configured to carry out operations comprising:
- 10.1. defining a position of the tool engagement interface of the screw at least plugged into the thread;
- 10.2. positioning the tool over the tool engagement interface and orienting the tool central axis with a maximum deviation of 8° concentrically with the screw central axis;
- 10.3. with force-regulated and/or impedance-regulated closed tilting movements of the tool central axis, moving the tool along the tool central axis into the tool engagement interface until there is a connection between the tool and the tool engagement interface;
- 10.4. screwing in the screw in a first direction of rotation of the tool until a defined limit value G1 of a torque acting on the tool has been reached or exceeded, wherein in an event that a positive locking connection is not achieved between the tool and the tool engagement interface in operation 10.3 or operation 10.4, the tool is moved for a given distance along the tool central axis away from the tool engagement interface, the tool is rotated by a given angle about the tool central axis, and operation 10.4 is performed again;
- 10.5. once the limit value G1 has been reached or exceeded, turning back the tool counter to the first direction of rotation through a defined angle in the range of 0.01° to 10°; and
- 10.6. removing the tool from the tool engagement interface along the tool central axis.

10. The device as claimed in claim 9, wherein in operation 10.6, removing the tool is performed under force-regulated and/or impedance-regulated closed tilting movements of the tool central axis.

11. The device as claimed in claim 10, wherein in operation 10.3 and/or in operation 10.6, the device is configured to additionally perform closed translatory lateral movements of the tool central axis.

12. The device as claimed claim 9, wherein in an event that a positive locking connection is not achieved between the tool and the tool engagement interface in operation 10.3 or operation 10.4 under given conditions, the device is configured to perform again operation 10.2 and operation 10.3 with automatically adapted parameters for the positioning of the tool and/or for the orienting of the tool central axis, or configured to drive the robot manipulator into a predefined position.

13. A system to control a movable robot manipulator for screwing in a sew at least already plugged into a thread, wherein the screw has a screw head with a tool engagement interface, the robot manipulator has at its distal end a tool designed to engage the tool engagement interface, the screw has a screw central axis, and the tool has a tool central axis about which the tool of the robot manipulator is rotatable, the system comprising:
- a data processing device; and
- a memory storing instructions that, when executed by the data processing device, cause the data processing device to perform operations comprising:
  - 10.1. defining a position of the tool engagement interface of the screw at least plugged into the thread;
  - 10.2. positioning the tool over the tool engagement interface and orienting the tool central axis with a maximum deviation of 8° concentrically with the screw central axis;
  - 10.3. with force-regulated and/or impedance-regulated closed tilting movements of the tool central axis, moving the tool along the tool central axis into the tool engagement interface until there is a connection between the tool and the tool engagement interface;
  - 10.4. screwing in the screw in a first direction of rotation of the tool until a defined limit value G1 of a torque/force acting on the tool has been reached or exceeded, wherein in an event that a positive locking connection is not achieved between the tool and the tool engagement interface in operation 10.3 or operation 10.4, moving the tool for a given distance along the tool central axis away from the tool engagement interface, rotating the tool by a given angle about the tool central axis, and performing again operation 10.4;
  - 10.5. once the limit value G1 has been reached or exceeded, turning back the tool counter to the first direction of rotation through a defined angle in the range of 0.01° to 10°; and
  - 10.6. removing the tool from the tool engagement interface along the tool central axis.

14. The system claimed in claim 13, wherein in operation 10.6, removing the tool is performed under force-regulated and/or impedance-regulated closed tilting movements of the tool central axis.

15. The system as claimed in claim 14, wherein in operation 10.3 and/or in operation 10.6, the data processing device additionally performs closed translatory lateral movements of the tool central axis.

16. The system as claimed claim 13, wherein in an event that a positive locking connection is not achieved between the tool and the tool engagement interface in operation 10.3 or operation 10.4 under given conditions, the data processing device performs again operation 10.2 and operation 10.3 with automatically adapted parameters for the positioning of the tool and/or for the orienting of the tool central axis, or performs an operation of driving the robot manipulator into a predefined posture.

17. A non-transitory machine-readable storage medium comprising instructions that, when executed by a data processing device, cause the data processing device to perform operations associated with controlling a movable robot manipulator for screwing in a screw at least already plugged into a thread, wherein the screw has a screw head with a tool engagement interface, the robot manipulator has at its distal end a tool designed to engage the tool engagement interface, the screw has a screw central axis, and the tool has a tool central axis about which the tool of the robot manipulator is rotatable, the operations comprising:
- 10.1. defining a position of the tool engagement interface of the screw at least plugged into the thread;
- 10.2. positioning the tool over the tool engagement interface and orienting the tool central axis with a maximum deviation of 8° concentrically with the screw central axis;
- 10.3. with force-regulated and/or impedance-regulated closed tilting movements of the tool central axis, moving the tool along the tool central axis into the tool engagement interface until there is a connection between the tool and the tool engagement interface;
- 10.4. screwing in the screw in a first direction of rotation of the tool until a defined limit value G1 of a torque/force acting on the tool has been reached or exceeded, wherein in an event that a positive locking connection is not achieved between the tool and the tool engagement interface in operation 10.3 or operation 10.4, moving the tool for a given distance along the tool central axis away from the tool engagement interface, rotating the tool by a given angle about the tool central axis, and performing again operation 10.4;

10.5. once the limit value G1 has been reached or exceeded, turning back the tool counter to the first direction of rotation though a defined angle in the range of 0.01° to 10°; and 10.6. removing the tool from the tool engagement interface along the tool central axis.

18. The non-transitory machine-readable storage medium as claimed in claim 17, wherein in operation 10.6, removing the tool is performed under force-regulated and/or impedance-regulated closed tilting movements of the tool central axis.

19. The non-transitory machine-readable storage medium as claimed in claim 18, wherein in operation 10.3 and/or in operation 10.6, the data processing device additionally performs closed translatory lateral movements of the tool central axis.

20. The non-transitory machine-readable storage medium as claimed in claim 17, wherein in an event that a positive locking connection is not achieved between the tool and the tool engagement interface in operation 10.3 or operation 10.4 under given conditions, the data processing device performs again operation 10.2 and operation 10.3 with automatically adapted parameters for the positioning of the tool and/or for the orienting of the tool central axis, or performs an operation of driving the robot manipulator into a predefined posture.

* * * * *